Jan. 3, 1939. J. L. DOSTAL 2,142,889
METHOD OF MAKING VALVE TAPPETS AND LIKE OBJECTS
Filed June 18, 1938 3 Sheets-Sheet 2
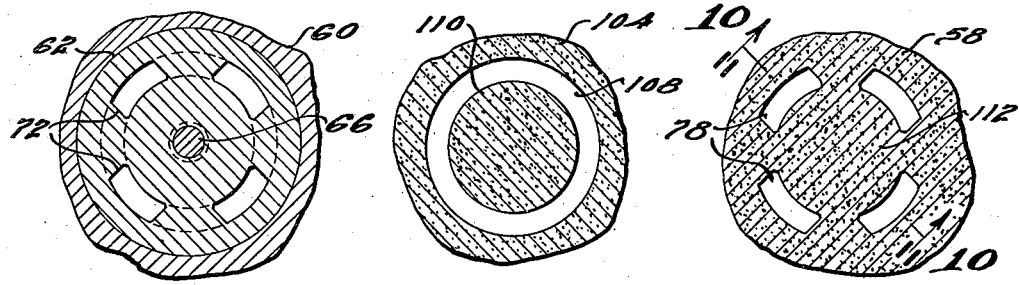
FIG. 7. FIG. 8. FIG. 9.
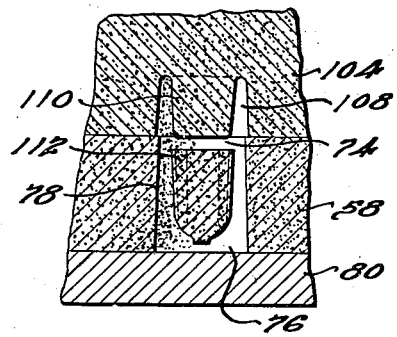 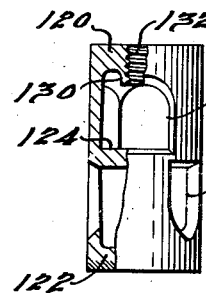 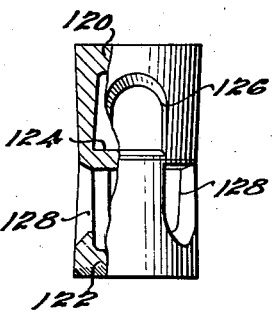
FIG. 10. FIG. 11. FIG. 12.
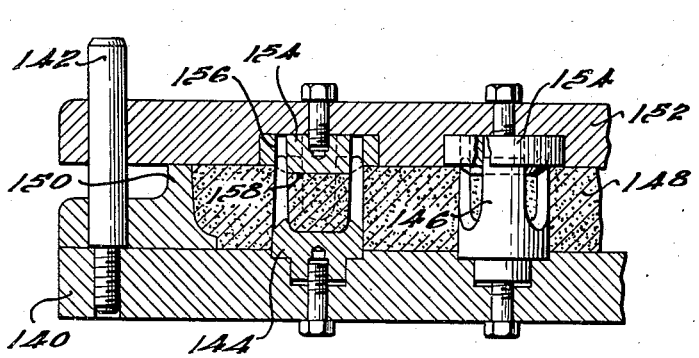 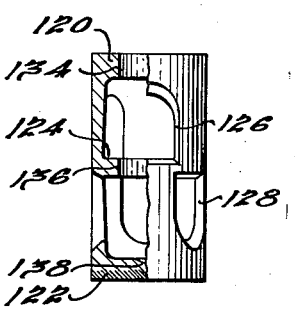
FIG. 14. FIG. 13.
INVENTOR
Joseph L. Dostal.
BY
Harness, Dickey & Pierce.
ATTORNEYS.

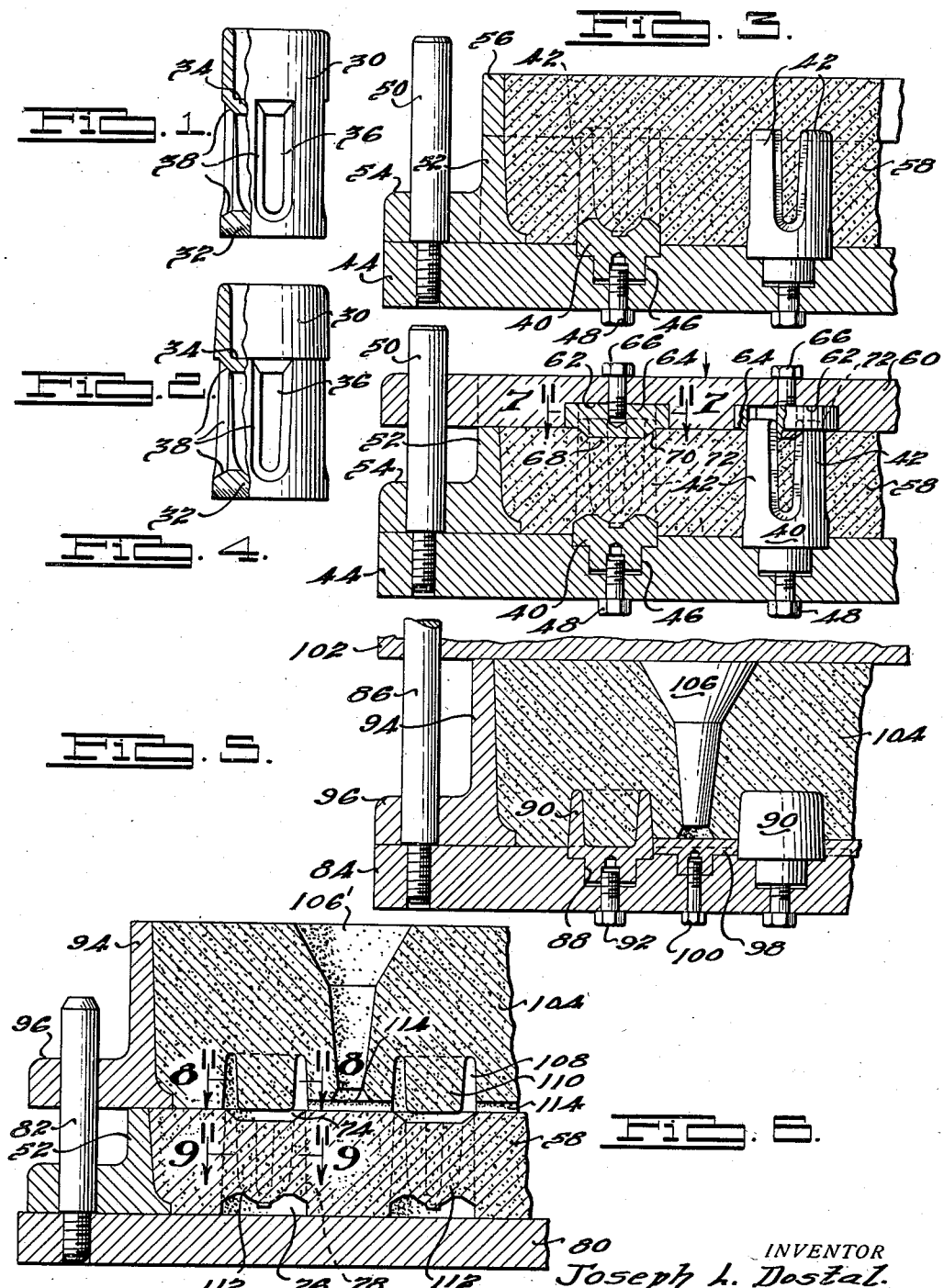

Jan. 3, 1939.  J. L. DOSTAL  2,142,889
METHOD OF MAKING VALVE TAPPETS AND LIKE OBJECTS
Filed June 18, 1938    3 Sheets-Sheet 3
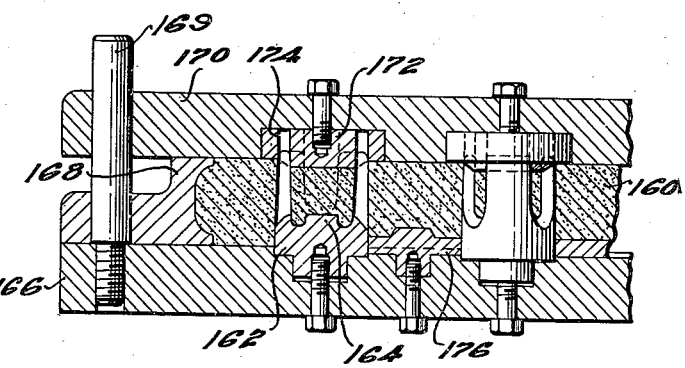
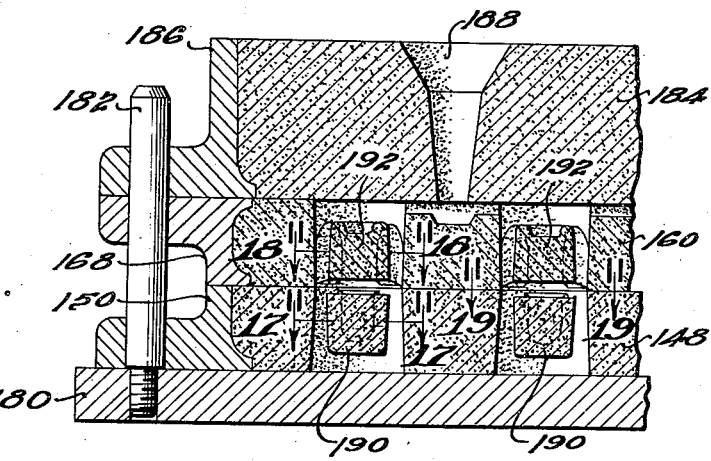
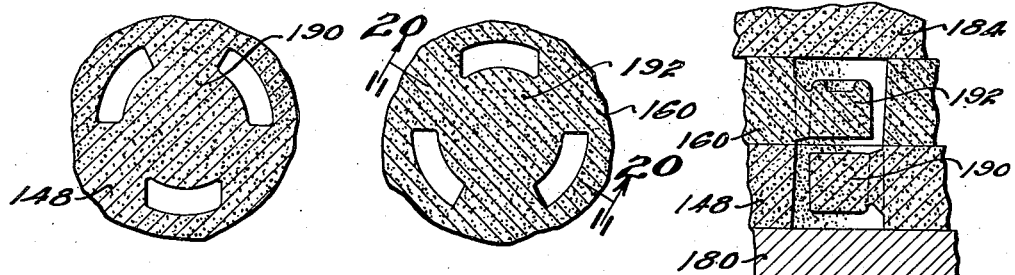
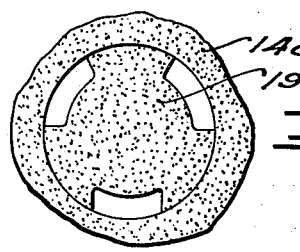
INVENTOR
Joseph L. Dostal.
BY
Harness, Dickey & Pierce.
ATTORNEYS.

Patented Jan. 3, 1939

2,142,889

UNITED STATES PATENT OFFICE 2,142,889

METHOD OF MAKING VALVE TAPPETS AND LIKE OBJECTS

Joseph L. Dostal, Birmingham, Mich., assignor to Eaton Manufacturing Company, Cleveland, Ohio, a corporation of Ohio Application June 18, 1938, Serial No. 214,491

12 Claims. (Cl. 22—198)

This invention relates broadly to the casting of integral hollow bodies and is particularly adaptable for use in making integral hollow valve tappets of the barrel type having one or more openings or windows in the peripheral walls thereof and, accordingly, for the sake of simplicity in description reference will be made herein only to the application of the present invention to the manufacture of such valve tappets, its application to the formation of other similar objects thus being made apparent to those skilled in the art.

Objects of the invention include the provision of a method of forming valve tappets of the integral hollow barrel type by a casting operation and without the necessity of employing a dry or baked sand core; the provision of a method of making an integral cast hollow barrel type valve tappet by the use of a green sand core; the provision of a method of making an integral cast hollow barrel type valve tappet having openings or windows in the periphery thereof and by means of which a great variety of arrangements for such openings or windows is possible; the provision of a method of making an integral cast hollow valve tappet of the barrel type having two or more axially spaced transverse walls without the necessity of employing a baked sand core; the provision of a method of making an integral cast hollow barrel type valve tappet having two or more axially spaced transverse walls with one or more openings or windows through the said walls thereof intermediate such walls and in which the marginal edges of such openings or windows are outwardly flared or relieved during the casting operation; the provision of a method of making integral hollow cast barrel type valve tappets by the practice of which such tappets may be cast in a materially more economical manner than heretofore possible by following previous practices, by the practice of which a superior valve tappet results, by the practice of which baked sand cores are entirely dispensed with, and by the practice of which a large number of similar tappets may be simultaneously molded and simultaneously or otherwise poured in a single mold.

The above being among the objects of the present invention the same consists in certain novel arrangements of parts and step or combination of steps of operation to be hereinafter described with reference to the accompanying drawings, and then claimed, having the above and other objects in view.

In the accompanying drawings which illustrate suitable apparatus for carrying out the invention, illustrative articles which may be formed by the employment thereof, and various steps of operation in the carrying out of the invention, Fig. 1 is a partially broken, partially sectioned side elevational view of a finished valve tappet which has been cast in accordance with the present invention;

Fig. 2 is a view similar to Fig. 1 but illustrating the tappet in its rough cast condition and before being machined to final state;

Fig. 3 is a fragmentary sectional view of a flask, mold, pattern plate and associated parts illustrating an initial operation in the casting of the valve tappet shown in Figs. 1 and 2 in accordance with the present invention;

Fig. 4 is a view similar to Fig. 3 but illustrating a subsequent step of operation;

Fig. 5 is a view similar to Fig. 4 but illustrating the formation of a cooperating mold part;

Fig. 6 is a fragmentary sectional view illustrating the assemblage of the mold parts formed as disclosed in Figs. 4 and 5 to form a completed mold, in conjunction with a chill plate;

Fig. 7 is an enlarged fragmentary transverse sectional view taken on the line 7—7 of Fig. 4;

Figs. 8 and 9 are enlarged fragmentary transverse sectional views taken on the lines 8—8 and 9—9 respectively of Fig. 6;

Fig. 10 is a reduced vertical sectional view taken on the line 10—10 of Fig. 9;

Fig. 11 is a partially broken, partially sectioned side elevational view of a modified form of tappet in finished condition;

Fig. 12 is a partially broken, partially sectioned side elevational view of the tappet shown in Fig. 11 in its rough cast condition before machining;

Fig. 13 is a view similar to Figs. 11 and 12 but illustrating a modified form of tappet construction obtained by machining the tappet shown in Fig. 12 in a manner different from that employed in forming the tappet shown in Fig. 11;

Fig. 14 is a fragmentary vertical sectional view taken through apparatus employed in forming one of the mold parts employed to produce the tappet shown in Fig. 12;

Fig. 15 is a view similar to Fig. 14 but illustrating apparatus and method of forming another mold part employed in the formation of the tappet shown in Fig. 12;

Fig. 16 is a fragmentary vertical sectional view taken through a completed mold including the mold parts shown in Figs. 14 and 15 and employed in the manufacture of the tappet shown in Fig. 12;

Figs. 17, 18 and 19 are enlarged fragmentary sectional views taken on the lines 17—17, 18—18 and 19—19 respectively of Fig. 16; and Fig. 20 is a fragmentary reduced vertical sectional view taken on the line 20—20 of Fig. 18.

One piece hollow cast iron valve tappets are conventionally produced by making a green sand mold consisting of a cope and drag and cooperating dry or baked sand core. According to this conventional method the patterns for the tappet are provided with core prints which form corresponding recesses in the molds and which receive the baked sand cores prior to closing the molds. These cores are, of course, provided for the purpose of forming the hollow interior desired in the finished tappet. It is obviously difficult to locate this small core in a green sand mold correctly, and as such dry or baked sand cores are relatively expensive to produce they represent a loss inasmuch as they are, of course, destroyed in the casting operation. The usual operation of making such dry or baked cores consists of mixing sharp sand with water and oil or other core binders, then ramming in core boxes and placing them in driers or standing them up on core plates, baking, cleaning, dipping in core wash, and then subjecting them to a second baking or drying step before they are ready for the molder to place them in a green sand mold.

According to the present invention the use, expense and waste of baked sand cores are eliminated and in place thereof a green sand core formed from and simultaneously with the green sand portions of the mold is employed in its place. This is accomplished by devising a green sand mold and so arranging the patterns for use in connection therewith that the act of molding the green sand molds simultaneously provides a core of green sand. Since the cost of making the mold according to the present invention is not any more than the cost of making the green sand mold in accordance with conventional methods, it will be appreciated that the cost of the baked sand cores employed in conventional methods is entirely eliminated and that this effects considerable saving in the cost of manufacturing such tappets. At the same time inasmuch as these green sand cores are formed simultaneously and integrally with the green sand molds, a much greater accuracy in the location of the cores is possible and the possibility of scrap due to misplaced or broken cores is materially diminished if not entirely eliminated. Furthermore as will hereinafter be more fully brought out, the present invention permits the casting of such tappets having unusual arrangements of openings or windows in the side walls thereof which would render their casting in accordance with conventional practices impossible commercially by the practice of conventional processes.

Briefly stated, the principal differences between the production of a valve tappet of the type described by the present invention as differentiated from conventional methods consists in so arranging the patterns that the parting line of the mold extends transversely to the axis of the tappet rather than parallel with the axis of the tappet as in conventional methods. Additionally in accordance with the present invention this parting line is arranged at or adjacent a transverse wall of the tappet to or adjacent to which the openings or windows in the side walls of the tappet approach or extend. By providing the parting line at or adjacent such transverse wall the necessity for bringing two green sand core portions into contact with each other in the mold, and consequent liability to breakage thereof, is eliminated, and by the provision of this parting line at such transverse wall to or adjacent to which such openings extend, makes it possible to withdraw the various portions of the pattern in an axial direction out of the mold and still leave the portions connecting the core and the mold proper, and forming the openings or windows in the tappet, intact. As will be appreciated from the following description the present invention is adaptable to the formation of such hollow tappets regardless of the number of transverse walls therein as in such case the mold may be formed of any number of sections adapted for placement one upon the other required to obtain the necessary parting lines in the mold to accommodate the different transverse walls.

Referring now to the drawings and particularly to Fig. 1 a one piece or integral hollow cast iron valve tappet is illustrated as comprising a generally cylindrical body 30 having a relatively thick transverse wall 32 closing its lower end and a second transverse wall 34 extending thereacross intermediate its opposite ends. The side walls of the tappet intermediate the transverse walls 32 and 34 is shown as being provided with a plurality (shown by way of illustration as four) of elongated openings or windows 36 therethrough arranged in equally angularly spaced relation about the axis of the tappet. It will be noted that the margins of the various openings or windows 36 are beveled or outwardly flared as at 38. This flaring is desirable in such tappets so as to eliminate a sharp cutting edge on the tappet at the surface of the bore in an internal combustion engine in which the tappet is intended to work and which sharp cutting edges, if allowed to remain, would tend to scrape away the lubricating oil on such surfaces and foster early destruction of the wearing surface of the bore as well as of the tappet. It may be noted at this point that such beveled marginal edges 38 may, of course, be machined in the tappet during the machining operations thereon and such machining operations must usually be resorted to to form such beveled margins where tappets are formed in accordance with conventional practices, but they may be formed during the casting operation by the practice of the method of the present invention and thereby effect an added saving in the cost of manufacture.

The lower wall 32 of the tappet is adapted for direct contact with a valve operating cam when assembled in an internal combustion engine and for that reason it is desirable that its exposed surface be of a relatively hard surface is accomplished in accordance with the present invention, as in conventional practice, by the use of a chill plate against which the metal at the corresponding tappet is cast.

The tappet illustrated in Fig. 1 is primarily intended for use upon internal combustion engines which employ push rods between the valve operating cam and the valve, the upper end thereof comprising a cup-shaped portion within which the lower end of the push rod is adapted to be received in contact with the transverse wall 34 thereof. Where it is desired that the push rod extends to and contacts with the lower wall 32 the wall 34 may be drilled centrally thereof to permit the passage of the push rod downwardly therethrough in such case. The formation of tappets of the type adapted to receive an adjusting screw will be described later in connection with a modified form of tappet construction.

Referring to Fig. 2 which shows the tappet illustrated in Fig. 1 in the form in which it occurs directly after the casting operation and before machining it will be noted that it is essentially similar to the tappet shown in Fig. 1 except that its exterior surface comprises two frusto-conical portions one of which includes the wall 32 and extends to the wall 34, and the other of which includes the wall 34 and the remainder of the tappet, the enlarged ends of such frusto-conical portions being located at the respective walls. As will hereinafter be appreciated these frusto-conical wall portions are produced as a result of the necessity of providing a draft on the pattern for withdrawing the pattern parts in an axial direction from the mold, and not as a matter of desirability, and although the rough casting illustrated in Fig. 2 could be formed so that its exterior surface represented but a single frusto-conical member this would only necessitate the provision of additional amounts of metal to machine away from the exterior surface of the rough casting in order to bring it to its final condition illustrated in Fig. 1 and, accordingly, would not be desirable for that reason.

Valve tappets may, of course, be formed in accordance with the present invention singly if desired, but inasmuch as the benefits of the present invention will be particularly great from a production standpoint wherein a plurality of such tappets are simultaneously formed in a single mold, and because of the fact that practice of the present invention permits a materially greater number of valve tappets to be simultaneously formed in a single mold than is possible in accordance with conventional practices in a mold of the same size, the present invention will be described in connection with a mold in which a plurality of such tappets are simultaneously formed.

Referring now to Fig. 3, in carrying out the present invention it will be noted that the pattern for each tappet is formed in two parts, which parts are separated from one another in an axial direction. That portion of the pattern illustrated in Fig. 3 is adapted to produce that portion of the mold which forms that portion of the tappet including the wall 32 and that portion of the body 30 extending therefrom up to the wall 34. Accordingly, the pattern illustrated in Fig. 3 comprises a portion 40 adapted to form the cross-wall 32 and four equally angularly spaced upwardly extending finger portions 42 which are adapted to form that portion of the body 30 of the tappet extending between the wall 32 and the wall 34 and the space between the fingers is adapted to form the various openings or windows 36. A plurality of such pattern portions are grouped upon a conventional pattern plate 44, conventionally formed of metal such as aluminum, and the upper surface of the pattern plate 44 is provided with a plurality of stepped recesses 46 corresponding in placement with the desired positions of the various patterns thereon. The above described pattern parts have their lower ends shaped for reception in the corresponding recesses 46 and are rigidly secured therein as by means of screws 48. It will be understood that only those portions of the pattern parts thus described extending above the upper surface of the pattern plate 44 duplicate the corresponding portions of the tappet illustrated in Fig. 2, for instance, with this exception only that the finger portions 42 are of a greater length than the distance between the wall 32 and the wall 34 in the finished product. It will also be understood that the side edges of the fingers 42 are suitably beveled or rounded so as to provide in the finished casting the corresponding beveled surfaces 38, these thus being formed in the mold without the necessity of subsequently providing them by a separate machining operation as in conventional practice.

In following out the present invention a pattern plate having a plurality of mold parts 40—42 arranged thereon as illustrated in Fig. 3 is positioned with these parts projecting upwardly as indicated. The pattern plate 44 is provided with two or more upwardly extending dowels 50 fixed thereto, and a flask 52 for the drag portion of the mold and having apertured ears or lugs 54 for reception of the dowels 50 is then placed on the pattern plate 44 in surrounding relation with respect to the various mold parts 40—42 thereon in the manner indicated. The flask 52 is followed by a strike-off 56 which serves to temporarily increase the height of the side walls of the flask 52 by an amount determined by the amount of compression which is desired to apply to the green sand in forming the drag. The next operation consists in filling the entire space within the flask 52 and strike-off 56 with green sand 58 for the drag portion of the mold, it being understood that this green sand completely surrounds the various patterns 40—42 filling the space interiorly thereof and between the various fingers 42.

The next step of operation is that illustrated in Fig. 4. In other words the strike-off 56 has been removed from the assemblage as indicated in Fig. 3 which thus leaves that portion of the green sand 58 contained therein and projecting above the upper edge of the flask 52 in free and unsupported state. A squeeze plate 60 provided with suitable openings therein for reception of dowel pins 50 is then applied over the dowel pins 50 and is forced downwardly until it abuts against the upper edge of the flask 52 as illustrated in Fig. 4. This step of operation comprises the green sand 58 to the degree of compactness desired in the finished mold.

In accordance with the present invention the squeeze plate 60 is also formed to provide a depression in the mold for forming the transverse walls 34 and preferably additionally formed to provide the bevel surfaces 38 thereon at the adjacent ends of the various windows or openings 36. This is accomplished in the example shown by providing a recess 62 in the lower face of the squeeze plate 60 in axial alignment with each of the patterns 40—42 and providing an insert 64 in each of the recesses 62 and securing the same therein as by means of a screw 66. The outer marginal portions of the lower face of each of the inserts 64 lies in flush relationship with respect to the lower face of the squeeze plate 60 and centrally of such outer margins each insert 64 is provided with a downwardly projecting portion 68 which extends downwardly beyond the lower face of the squeeze plate 60 by an amount equal to the desired thickness of the wall 34. Where it is desired to form the bevel face 38 at the periphery of the wall 30 over the area of each window 36, the peripheral portion of each projection 68 is beveled as at 70, this bevel extending from the point of junction of the lower surface 70 of the squeeze plate 60 with the outer edges of the various fingers 42 and extends downwardly and inwardly therefrom to the inner edges of the fingers 42.

Each insert 64 is provided with an opening 72 therein for reception of the upper end of each of the corresponding fingers 42 so that when the squeeze plate 60 is applied and pressed downwardly against the upper edge of the flask 52 the upper ends of the various fingers 42 will project into their corresponding openings 72 in the inserts 64 to permit completion of the downward movement of the squeeze plate. This insures a clean junction in the finished mold between that portion of the mold formed by the projection 68 and forming the cross-wall 34 and those portions of the mold formed by the corresponding fingers 42 and forming the side walls of the tappet in the finished product.

It will be noted that with the arrangement illustrated in Fig. 4 the height of the flask 52 corresponds exactly with the height of that portion of the tappet shown in Fig. 2 from the bottom of the lower wall 32 to the top of the upper wall 34. It will also be understood that when the squeeze plate 60 is removed from the assemblage shown in Fig. 4 and the flask 52 and drag 58 are removed from the pattern plate 44 and the various patterns 40—42, the drag 58 will be formed to provide, as illustrated in Fig. 6, a depression 74 in its upper surface at the area where the upper wall 34 of each tappet is to be formed therein, a depression 76 in its lower surface at the point where the lower wall 32 of each tappet is to be formed therein, and a plurality of arcuately shaped openings 78 interconnecting the depressions 74 and 76 and which will act to form the body of the tappet between the walls 32 and 34. The flask 52 with the drag 58 therein formed in the manner illustrated in connection with Fig. 4 when lifted off of the pattern plates 54 is immediately placed in the same upright position upon a chill plate such as 80, illustrated in Fig. 6, usually formed of cast iron, copper or other suitable material. The chill plate 80 is provided with dowel pins 82, corresponding in position with the dowel pins 50 in the pattern plate 44, which thus serve to cooperate with the dowel pin openings in the flask 52 to properly locate it upon the chill plate 80.

In order to complete the mold a second pattern plate 84, corresponding to the pattern plate 44 previously described and provided with correspondingly placed dowels 86 corresponding to the dowels 50 previously described is provided with a plurality of stepped recesses 88, corresponding to the recesses 46 previously described, which recesses are equal in number to the recesses 46 and are correspondingly located with respect to each other and to the corresponding dowel pins 86. As a matter of fact the pattern plate 84 with its recesses 88 and dowels 86 may be exact duplicates of the pattern plates 44, recesses 46 and dowel pins 50. The patterns 90 received in the recesses 88 are, however, in this case more or less cup-shaped with their bottom portion formed for complementary engagement with the recesses 88 and for securement therein by screws 92 which duplicate the arrangement and function of the screws 48 previously described. In the particular arrangement shown in Figs. 1 to 10, inclusive, by way of illustration and because of the fact that the inserts 62 of the squeeze plates 60 previously described form a depression 74 in the drag 58 sufficiently deep to form the wall 34 in the completed product, the inner bottom wall of the pattern 90 is shown as being in flush relationship with respect to the top surface of the pattern plate 84 so that as will be appreciated all of the wall 34 in the final product will be formed in the drag 58 and none in the cope. It will, of course, be appreciated that if the inner bottom wall of the pattern 90 was raised above the upper surface of the pattern plate 84 by a distance equal to the thickness of the wall 34, then the projections 68 on the inserts 62 could be dispensed with and in such case all of the wall 34 would be formed in the cope portion of the mold and none in the drag. Ordinarily this last described arrangement will not be desirable for the reason that in such case it will not be practicable to form the beveled surfaces 38 at the upper edges of the windows 36 in the final product during the casting operation. In either case, however, it will be understood that that portion of the pattern 90 projecting above the upper face of the pattern plate 84 is a duplicate of that portion of the cast tappet shown in Fig. 2 located above the upper surface of the transverse wall 34 where the insert projections 68 are employed and above the lower surface of the wall 34 when such projections as 68 are not employed.

With the arrangement of parts thus far described in connection with Fig. 5, a flask 94 having apertured ears 96, corresponding to the flask 52 and ears 54 previously described, is guided downwardly into surrounding relationship with respect to the various patterns 90 by means of the dowel pins 86 until it rests upon the upper surface of the pattern plate 84. It might be noted that the only difference between the flask 94 and the flask 52 is that the flask 94, adapted to contain the sprue hole, is made of greater depth so that the proper head of molten metal will be obtained in the finished mold. It may also be noted that where, as assumed in the present case, it is desired to form the various gates for the molds in the cope, the upper surface of the pattern plate 84 will be provided with gate patterns 98 connecting the various patterns 90 in one or more groups, the gate patterns 98 being secured in place by screws 100 in a manner similar to which the screws 92 hold the various patterns 90 in place.

With the arrangement of parts as thus far described in connection with Fig. 5 the flask 94 is provided with a strike-off (not shown), similar to the strike-off 56 previously described in connection with Fig. 3, and the flask 94 and the strike-off is then filled with green sand, the strike-off removed, and a squeeze plate 102 preferably guided upon the various dowels 86 is pressed downwardly into contact with the upper edge of the flask 94 to complete the desired compression of the green sand to form the cope 104. A sprue 106 may be provided between one or more of the gate patterns 98 and the upper surface of the cope 104 to provide passage for the molten metal to the gates in accordance with conventional practice.

After the operations thus far described in connection with Fig. 5 are completed, the squeeze plate 102 is removed, the flask 94 and cope 104 are removed from the pattern plate 84 and patterns 90 and, guided by the dowel pins 82 on the chill plate 80, are guided downwardly onto the upper surface of the flask 52 and drag 58 as illustrated in Fig. 6, thus completing the mold. In this connection it will be noted that the various mold depressions 108 formed in the cope 104 by the patterns 90 are each arranged in axial alignment with the corresponding mold depressions 74, 76, 78 formed by the patterns in the drag 58 and that they cooperate therewith to form a plurality of mold depressions each corresponding in all respects to the tappet illustrated in Fig. 2. It will also be noted that each core portion 110 surrounded by the corresponding depression 108 in the cope 104 and formed of green sand integrally with the cope 104 is arranged in axially spaced relation with respect to the core portion 112 for the corresponding mold depression in the drag 58 and these core portions 112 are free from contact with either the chill plate 80 or cope 104 and are integrally connected with the green sand drag 58 through the spaces which will form the windows 36 in the final product. It will also be understood that the gate patterns 98 will form gates 114 connecting the various mold depressions in one or more groups each fed by a sprue hole 106' so that when the mold is poured a plurality of tappets such as illustrated in Fig. 2 will be created connected in groups by the gates which when broken away will produce a plurality of individual tappets of the type illustrated in Fig. 2 and which when machined may assume the condition illustrated in Fig. 1.

It is to be particularly noted from the above that the cores 110 and 112 are formed of green sand integrally with the cope and drag, respectively, simultaneously therewith and, accordingly, are provided in a simple, cheap and effective manner, their exactness in position is assured at all times and, being free of contact with other parts of the mold during and after closing of the mold except for the bond integrally connecting them with the cope and drag respectively, there is little possibility of breakage of the core or displacement thereof prior to the casting operation or the displacement of molding sand into the mold cavities because of core insertions, core misplacements or breakages. Practice has indicated that tappets produced in accordance with the above described procedure may be produced more economically, more accurately and with less scrap than tappets produced in accordance with conventional practices.

The above described procedure may be expanded to produce tappets or like objects having more than two transverse walls simply by providing a mold structure in which a parting line is provided therein at or adjacent the plane of each wall, it being assumed in such case that where a chill plate is employed to close one end of the mold a parting line is provided between the chill plate and the mold proper. In order to illustrate this more clearly a modified form of tappet and method of manufacturing the same is illustrated in Figs. 11 to 19, inclusive. The tappet shown in these figures, in order to further illustrate the advantages of the present invention in being able to readily form tappets impractical to form commercially according to conventional practices, is illustrated as having three equally angularly spaced windows at each end thereof, the windows at one end being angularly staggered about the axis of the tappet with respect to the windows at the opposite end. If it was attempted to form such tappet according to conventional practices with dry or baked sand cores it would be necessary to solely support one of the cores through the print for one of the windows only prior to closing the mold, this fact making it commercially impractical to support such core with the ease and accuracy required for commercial practices without shifting of the core during pouring.

The rough cast tappet in this modification is illustrated in Fig. 12 in which it will be noted that it is of generally cylindrical shape having opposite end walls 120 and 122 and a solid intermediate wall 124 which may be located in any suitable position between the walls 120 and 122 but which, for the purpose of illustration, is shown as being located midway therebetween. Technically speaking the peripheral surfaces of the tappet shown in Fig. 12 simulates a pair of truncated cones arranged with their small ends in abutting relationship at or adjacent the plane of the intermediate wall 124, this relationship being occasioned by the draft necessary in the patterns to permit their ready withdrawal from the mold as will readily be appreciated by those skilled in the art. That portion of the tappet above the intermediate wall 124 is provided with three equally angularly spaced openings or windows 126 therein and that portion of the tappet below the wall 124 is provided with three equally angularly spaced openings or windows 128 therein, the windows 126 being staggered angularly of the axis of the tappet with respect to the windows 128 and extending to the corresponding surfaces of the intermediate wall 124. As in the case of the tappets previously described the marginal edges of all of the windows 126 and 128 are preferably outwardly flared or beveled in the casting operation, and as this is accomplished in substantially the same manner as explained in connection with the first described construction, no further explanation in this respect will be required here.

Where this modified form of tappet is to be adapted to receive a suitable or conventional type of valve clearance adjusting screw its upper end may be provided with a suitable boss to be drilled and tapped for reception of such screw, and although this boss may be provided on the inner or the outer surface of such end wall it is illustrated, merely as a matter of simplicity in description, on the inner surface of the upper wall 120 as in such case it is not necessary to provide an additional pattern plate for the bottom face of the cover mold for the sole purpose of providing these bosses on the outer face as will be readily appreciated by those skilled in the art. Accordingly, it will be noted in Fig. 11 which illustrates the rough cast tappet of Fig. 12 machined to one final form, the upper wall 120 is provided on its inner face with a downwardly projecting boss 130 which is centrally tapped and threaded as at 132 for reception of a conventional valve clearance adjusting screw (not shown).

The tappet illustrated in Fig. 11 is machined to provide a perfectly cylindrical exterior surface, its opposite ends have been machined flat, and the intermediate wall 124 has been allowed to remain in its originally cast unperforated state. The type of tappet shown in Fig. 11 is that commonly employed for direct interposition between a valve operating cam and the stem of a valve.

Where it is desired to adapt the tappet shown in Fig. 12 for use with a push rod type of valve mechanism, the rough tappet illustrated in Fig. 12 may be machined as indicated in Fig. 13, that is the peripheral surfaces of the tappet may be machined into true cylindrical conformation and at least the upper wall 120 may be drilled out as at 134 to permit the passage of a push rod downwardly therethrough. The push rod may be allowed to seat upon the intermediate wall 124, or such intermediate wall may be drilled out as at 136 to permit the further passage of the push rod down to the bottom wall 122 and which, in such case, may be provided with a central pocket or depression 138 to receive the lower end of such push rod. It will be appreciated that the rough casting illustrated in Fig. 12 may be machined in other ways to provide other types of completed tappet structures, the present phase of the invention being concerned only with the production of the rough tappet as illustrated in Fig. 12.

As in the production of the first described tappet and as illustrated in Fig. 14, in producing the tappet shown in Fig. 12 a pattern plate 140 is provided with dowels 142 and with a plurality of patterns 144 set into and projecting above the upper face thereof in substantially the same manner as previously described. The patterns 144 in this case are of similar construction to the patterns 40—42 previously described except the leg portions 146 thereof are shorter so as to accommodate them to the distance between the walls 122 and 124 and are only three in number to correspond to the three windows to be provided at the corresponding end of the completed tappet. Also in this case the spaces between the legs 146 which will correspond to the windows 128 in the final product are all arranged in a predetermined position with respect to each other and to the pattern plate 140, this being necessary in order to correlate the window openings in one end of the tappet with the window openings in the opposite end in the finished product as will be readily appreciated.

In forming the green sand drag portion 118 of the mold about the patterns 144 the same general procedure as illustrated and described in connection with Figs. 3 and 4 for the previously described type of tappets are as follows. In other words a strike-off (not shown) is placed upon the flask 150, the flask and strike-off are filled with green sand, the strike-off is removed, and squeeze plate 152 guided on the dowels 142 is forced downwardly to compress the green sand to the desired degree and to bring its upper surface into flush relationship with the upper edge of the flask 150. Also as in the previously described construction the lower face of the squeeze plate 152 is provided with a plurality of inserts 154 each having openings 156 therein to accommodate the upper ends of the fingers 146 when the squeeze plate 152 is pressed down into final position. The inserts 154 are also provided on their lower face with projecting portions 158 corresponding in substantially all respects to the projections 68 previoulу described and serving the same purpose in providing the mold depression for the intermediate wall 124 and the beveled edges for the windows 128. It may be noted, however, that in this case the projections 158 project downwardly below the lower face of the squeeze plate 152 a distance equal to only half of the thickness of the wall 124, this practice being preferably followed in the present instance in order to permit a like projection on the inserts for the squeeze plate for the cope and thus provide bevels at the adjacent ends of both the windows 126 and 128.

As illustrated in Fig. 15 substantially the same apparatus and procedure is employed in forming the cope 160 for this modified form of tappet as is employed for forming the drag 148 and as illustrated in Fig. 14. In fact if it were not for the difference between the patterns 144 and 162 required to form the boss 130, the patterns 144 and 162 could be identical, and the fingers of the pattern 162 arranged in identically the same relation as the fingers 146 for the patterns 144 and still obtain the staggered relation of the openings 126 and 128 desired in the final product. This is true because of the fact that the cope 160 will be rolled over upon the drag 148 in practice, thus automatically staggering the depressions in these two mold parts formed by the finger portions of the patterns. However, because of the assumed desirability of the present case of forming the bosses 130, the patterns 162 are formed to provide similar boss portions 164 as illustrated in Fig. 15. It will, of course, be understood that the patterns 162 are located on the pattern plate 166 in such relation that when the flask 168 is rolled over and placed upon the flask 150 each mold depression in the cope 160 will be accurately aligned axially with a cooperating mold depression in the drag 148. It may be mentioned that the pattern plate 166 is provided with dowels 169 and the cooperating squeeze plate 170 is provided with inserts 172 provided with openings 174 for reception of the upper ends of the finger portions of the patterns 162 in identically the same manner as previously described. Also where it is desired to provide the gates in the cope 160, the pattern plate 166 is provided with gate patterns 176, of a nature similar to the gate patterns 98 previously described in connection with the first described construction and similarly secured in place thereto and connecting the various patterns 162 in one or more groups.

In carrying out the operations to complete a mold in this modification a chill plate 180, corresponding to the chill plate 80 first described and provided with dowels 182, is employed. After the squeeze plate 152 illustrated in Fig. 14 has been removed from the drag 148, the drag 148 and flask 150 are removed from the pattern plate 140 and are placed in the same relative position upon the chill plate 180, the flask 150 being guided by the dowel pins 182 into position thereon. In a similar manner the squeeze plate 170 illustrated in Fig. 15 is removed from the cope 160 and the cope 160 and flask 168 are in turn removed from the pattern plate 166 and in this case rolled over and, guided by the dowels 182, are lowered upon the flask 150 and drag 148 as illustrated in Fig. 16. This is followed by a cover mold 184 formed in a flask 186 also guided upon the dowels 182 into downwardly resting relation upon the flask 168 and cope 160, the cover mold 184 being provided with a sprue opening 188 leading from its upper surface to a gate for each gated group of mold depressions thus formed in the drag 148 and cope 160.

It is to be noted from an inspection of Fig. 16 that the projecting portions of the inserts 154 and 172 form corresponding depressions in the drag 148 and cope 160 which cooperate with each other in the finished mold to provide a circular depression which when filled with metal will form the intermediate wall 124, and depressions are formed in the opposite faces of the drag and cope, respectively, which when filled with metal will form the lower wall 122 and the upper wall 120, respectively, in the finished tappet. Thus the core portion 190 for the lower portion of each tappet is formed of green sand and is connected to the rest of the mold through the space between the fingers of the corresponding portion of the pattern and its opposite ends lie in spaced relation to both the adjacent faces of the chill plate 180 and cope 160. Likewise the core portion 192 for the upper portion of each tappet is formed from green sand and similarly connected to the remainder of the cope 180 and is spaced at its opposite ends from the adjacent faces of the drag 148 and cover mold 184. These core portions are thus supported in such a manner as to eliminate the possibility of breakage during closing of the mold through necessity of contacting any other part of the mold structure.

From the above it will be understood that by the practice of the present invention any hollow body having openings or windows in a side wall thereof may be easily and quickly produced in an economical manner by the practices of the present invention as long as such windows extend to a point at or adjacent a transverse wall of the article being cast to thus permit the formation of the pattern with fingers permitting withdrawal thereof in an axial direction or at least perpendicular to the line of split between the mold parts, and that where desired the edges of the windows or openings thus formed may be readily provided in the casting operation with beveled or rounded edges and the cross-sectional configuration of that portion of the object between the windows may be of any desired regular or irregular conformation. It will also be appreciated that by the practices of the present invention the core portions in all cases are formed of green sand simultaneously with the corresponding mold parts, at no greater expense or labor than that required to form such corresponding parts in accordance with conventional practices independently of the cores and that, accordingly, the expense, trouble and un ertainty by the use of dry or baked sand cores is ... rely eliminated in the practices of the present invention.

It will be appreciated that knowledge of the disclosure herein contained will make the application of the invention readily adaptable to those skilled in the art to the production of a great variety of designs of tappets and other similar hollow bodies and, accordingly, it will be understood that formal changes may be made in the specific embodiments of the present invention herein disclosed without departing from the spirit or substance of the broad invention, the scope of which is commensurate with the appended claims.

What I claim is:

1. In the formation of a hollow body having a pair of spaced transverse walls and a windowed body interconnecting said walls, the steps of providing a pattern for said body in parts separable adjacent the plane of one of said walls and at least one of which parts includes angularly spaced fingers for forming that portion of the body between said windows, molding green sand about and within said fingered parts to a depth no greater than the height of said fingers whereby said fingers will aid in forming passages extending completely through said sand when withdrawn therefrom and a green sand core for said body between said fingers, separately molding green sand about another of said parts, providing a depression in one of said green sand molds at the area of intended junction between the depressions therein formed by said pattern parts, withdrawing said pattern parts from said mold, closing said mold, and then filling the mold depressions thus provided with the material to be cast.

2. In the formation of a hollow body having a pair of spaced transverse walls and a windowed body interconnecting said walls, the steps of providing a pattern for said body in parts separable adjacent the plane of one of said walls and at least one of which parts includes fingers for forming that portion of the body between said windows, molding green sand about said fingered parts with the fingers extending approximately normal to the parting line of said mold and to a depth not greater than the length of said fingered parts, simultaneously molding green sand in the interior of said fingered parts and causing the same to be integrally united with the green sand surrounding said part, separately molding green sand about another of said parts, providing a depression in one of said green sand molds at the area of its intended junction between the mold depressions formed by said pattern parts, withdrawing said pattern parts from said mold and closing said mold.

3. In the formation of a hollow member having a pair of spaced transverse walls and a windowed body interconnecting said walls, by the use of a green sand mold, the steps of forming a depression in one face of a green sand mold part to correspond with one of said walls and forming spaced passages extending through said mold part corresponding with that portion desired in the body between the windows therein, providing additional mold parts for cooperation with the first mentioned mold part to close the opposite faces thereof, and forming a depression in one of said mold parts at the parting line between the first mentioned mold part and the additional mold part cooperating with that face of the first mentioned mold part opposite that face thereof having the first mentioned depression therein, whereby a green sand core is provided in the first mentioned mold part integrally united thereto through the areas adapted to form said windows and spaced at opposite ends thereof from cooperating adjacent mold parts.

4. In the formation of a hollow body having spaced transverse walls and windowed walls connecting the same, the step of providing a multipart pattern simulating said body and parts of which pattern are longitudinally separable adjacent one of said walls whereby the interconnecting wall portion of said body presents at least in part in said pattern fingers projecting transversely with respect to the planes of the transverse wall portions of said pattern, molding green molding sand about and within that portion of said pattern provided with said finger portions and with said finger portions directed perpendicularly with respect to a face of the mold part thus formed to a depth over said finger portions not exceeding the height of said finger portions, providing cooperating mold parts for closing the opposite faces of the first mentioned mold part, and providing a depression in one or more of the mold parts adjacent the parting lines for both faces of the first mentioned mold part whereby the core formed from green sand in said first mentioned mold part within said finger portions lies in spaced relation at its opposite ends with respect to the opposed faces of said cooperating mold parts.

5. In the formation of a hollow body including a pair of spaced transverse walls and a hollow interconnecting portion having windows therein by a casting operation, the step of forming a pattern, corresponding with said body, in parts separated at one end of the windows and adjacent one of said walls whereby that portion of the pattern including the windowed interconnecting portion of the final product includes a portion corresponding to one of said transverse walls and perpendicularly extending spaced fingers projecting therefrom corresponding with said interconnecting portion, molding green sand about and within said finger portions of said pattern and to such a depth that when withdrawn from the mold part thus provided the mold part will be provided with a mold depression including a depression in one face thereof corresponding with said one of said transverse wall portions of said pattern and spaced passages extending therefrom through the mold to the opposite face thereof corresponding with said finger portions, providing an additional mold part to close that portion of the first mentioned mold part having said depression therein, providing an additional mold part to close the opposite face of said first mentioned mold part, providing a depression in one of the mold parts at the parting line between said first mentioned mold part and said additional mold parts whereby the green sand core provided interiorly of the area circumscribed by said fingers in said first mentioned mold part and connected thereto between the passages formed therein by said finger portions is spaced at opposite ends thereof from said additional mold parts.

6. In the manufacture of one piece hollow barrel type windowed valve tappet by casting metal in a pattern formed depression in a mold, provided by molding green sand about a suitable pattern, the steps of forming the pattern so that that portion thereof adapted to form the mold depression corresponds substantially exactly both internally and externally with the rough cast tappet to be produced, splitting the pattern in a plane parallel with and adjacent one of said transverse walls and extending the windows therein to said line of split whereby one of said portions of said pattern comprises a part corresponding with one of said transverse walls and fingers projecting axially therefrom, molding green sand about and within said fingered portion of said pattern with said pattern extending perpendicularly with respect to a face of the resulting mold and molding said green sand to a depth not exceeding the depth of said fingered portion of said pattern whereby, upon removal of said pattern from said mold, a depression is formed in one face of said mold corresponding with the transverse wall portion of said fingered portion of the pattern and axially directed angularly spaced passages are provided between said depression and the opposite face of said mold, providing additional mold parts for closing the opposite faces of said mold, and providing a depression between said passages in that face of said mold opposite that face containing the first mentioned depression whereby the green sand core formed between said passages is free of contact with said mold parts.

7. In the formation of an integral hollow barrel type tappet including a pair of spaced transverse walls and an interconnecting hollow body part having windows therein extending axially to substantially the plane of one of said walls, by a casting process, the steps of forming a green sand mold part having a depression in one face thereof corresponding with one of said transverse walls and having a plurality of angularly spaced passages extending completely therethrough communicating said depression with the opposite face of said mold part, providing additional mold parts for closing the opposite faces of the first mentioned mold part, providing a depression between said passages adjacent the parting line between the first mentioned mold part and that additional mold part closing that face of the first mentioned mold part opposite the first mentioned depression therein, and then pouring the mold assembly thus provided.

8. In the formation of a one-piece hollow barrel type tappet having spaced transverse walls and windows in the side walls thereof extending substantially to the plane of at least one of said transverse walls, the step of providing a green sand mold part having a pair of aligned depressions in opposite faces thereof and angularly spaced passages interconnecting said depressions, providing additional mold parts closing the opposite faces of the first mentioned mold part, and pouring the mold assembly thus provided.

9. In the manufacture of a one-piece, hollow, barrel type valve tappet having a pair of axially spaced transversely arranged walls and side walls having angularly spaced windows therein, by a casting operation, the steps of providing a green sand mold having a depression in one face thereof corresponding with one of said transverse walls to be formed and having a depression in the opposite face thereof corresponding with the depression for forming the other of said transverse walls, forming angularly spaced passages communicating the peripheral portions of said depression, beveling the side walls of said depression angularly between said passages, closing the opposite faces of said mold, and filling the thus molded spaces formed therein with molten metal.

10. In the manufacture of an integral barrel type hollow valve tappet having a pair of axially spaced transversely extending walls and side wall portion interconnecting said transverse walls and provided with windows extending substantially to the plane of at least one of said transverse walls, the steps of providing at least three superposed mold parts, providing aligned depressions in at least one of said mold parts adjacent the parting lines between the intermediate of said mold parts and the mold parts cooperating with opposite faces thereof, providing angularly spaced passages in said intermediate mold part interconnecting the peripheral portions of said depressions, and filling said depressions and passages with molten metal.

11. In the manufacture of a one-piece, hollow cylindrical cast valve tappet having a pair of axially spaced transverse walls and windows in the longitudinally extending wall portion connecting said axially spaced walls, the steps of forming a green sand mold part with aligned depressions in opposite faces thereof corresponding in size and spacing to the size and spacing of said axially spaced walls and forming angularly spaced passages in said mold part connecting said depressions and corresponding in size and angular spacing to said longitudinally extending wall portion, closing the opposite faces of said mold part, and filling said depressions and passages with molten metal.

12. In the manufacture of a one-piece, hollow, cylindrical valve tappet having a pair of axially spaced transverse walls, a longitudinally extending wall portion between said transverse walls provided with a plurality of windows therein, and an additional longitudinally extending wall portion axially beyond one of said transverse walls with respect to the first mentioned longitudinally extending wall portion, the steps of forming a green sand mold part of a thickness approximately equal to the distance between said transverse walls and a mold part for closing each of the faces of the first mentioned mold part, providing a plurality of passages in said first mentioned mold part simulating said first mentioned longitudinally extending wall part and communicating said opposite faces of said first mentioned mold part, forming cavities corresponding with said transverse walls in at least one of said mold parts adjacent the parting line between said first mentioned mold part and the second mentioned mold parts, in centered relation with respect to said passages collectively, forming a cavity in one of said second mentioned mold parts simulating said additional longitudinally extending wall portion in centered relation with respect to said passages collectively and in open communication with one of the first mentioned cavities, and then filling said passages and cavities with molten metal.

JOSEPH L. DOSTAL.